United States Patent Office 2,887,825
Patented May 26, 1959

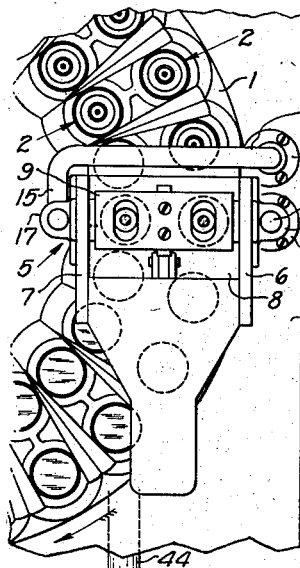

2,887,825

BASE MAKING APPARATUS

Albert L. Spaller, Conneaut, Ohio, assignor to General Electric Company, a corporation of New York Application May 15, 1956, Serial No. 584,975

4 Claims. (Cl. 49—14)

The present invention relates to apparatus for making bases for electric lamps and similar devices and more particularly to bases of the type including shell and center eyelet contact pieces of metal united and electrically insulated from each other by a molded web of glass.

In Patent No. 2,538,589, patented January 16, 1951, by Stanley Poje and assigned to the assignee of the present application an apparatus for making bases of this type is disclosed and claimed. As disclosed in this patent the conventional type of machine for making such bases and particularly for molding the glass insulation part thereof includes an intermittently rotating turret carrying a series of upright molds which hold the base shell and eyelet in spaced positions prior to the molding of the glass and which are successively carried by the turret to a charging station where the shell is partly filled with molten glass from a continuous free falling stream of molten glass from the orifice of a glass furnace.

As the molds are indexed away from the charging station, the glass stream lays a connecting string of glass which extends over the edges of the base shells projecting slightly above the mold. This string of glass is severed by means of one or more cutter mechanisms which move a flat faced member down against the edge of the base shell, such severance of the glass string serving to allow the glass lying against the inside of the base shell to flow down and unite with the remainder of the glass at the bottom of the mold.

The improvement in such machines disclosed and claimed in the patent is in the shape of the mold whereby the severing of the connecting glass strings extending between the molds during the base forming operation is accomplished in a positive manner to produce bases uniformly free of glass strings on the inner side of the base shell. The improvement in the molds providing these results consists in a novel shape of the shell holder of the mold. In place of the prior shell holders having relatively wide flat surfaced upper ends which adjoin one another along the center line of movement of the molds the successive shell holders of the patented machine have opposing wall portions diverging upwardly to define upwardly enlarged openings therebetween of sufficient depth and width to permit the glass strings deposited between successive holders to drop freely therebetween and become attenuated at their opposite ends. The attenuated parts of the glass strings rest on the upper edges of the base shells extending slightly above the upper rims of the shell holders and are readily severed by the flat faced cutter.

While machines incorporating the molds disclosed and claimed in the patent referred to above have been successfully used commercially for the purpose for which the machine was designed, the glass strings extending between successive shells in the holders has added to the cost of producing such bases on such machines. Of course, a considerable quantity of glass is involved in making such bases on a mass production basis and the glass making up this portion of the string was useful only as glass cullet.

The principal object of the present invention is to provide a machine of the above type in which shell holders of the conventional type, or of the improved type, or of a different type may be used, which has all the advantages of the machine incorporating the improved type of shell holders and which, in addition, eliminates the formation of glass strings between successive base shells in the holders on the turret. Another object of the invention is to provide a mechanism for cutting the glass stream and collecting glass therefrom during the indexing movements of the turret of the machine. Further objects and advantages of the invention will appear from the following detailed description of a species thereof, from the accompanying drawing and the appended claims.

In accordance with these objects a machine embodying the invention includes a mechanism controlled by the operating mechanism of the turret for cutting the free-falling glass stream and collecting glass from the stream on each successive movement of the turret from one position to the next. On completion of each indexing movement of the turret the mechanism deposits in a mold on the turret the glass it has collected during the movement of the turret and also permits the glass stream to flow freely into the mold from the orifice of the furnace. This operation of the turret and the glass stream cutting and collecting mechanism is so correlated to the rate of flow of the glass stream from the furnace that repeated operation of the machine is effective for charging a series of base contact containing molds on the turret with glass sufficient in amount to form the molded glass insulation piece of the base.

The glass stream cutting and collecting mechanism includes a perforated stationary blade or knife and a deflector having an opening therethrough and pivoted for rocking between a closed position and an open position and which cooperates with the stationary blade in a shearing action to sever the glass stream cleanly and to collect within its opening the glass in the stream during movement of the turret from one indexed position to the next.

The clean severing of the glass stream and the collecting of the glass of the stream by the mechanism eliminates the formation of glass strings extending between the glass charges in the successive molds and, of course, the glass string cutter mechanisms used heretofore for severing the glass strings at the edges of the base shells are no longer needed. In addition the upper edges of the shells need not extend upward beyond the upper rims of the shell holders though this is, of course, permissible.

In the drawing accompanying and forming part of this specification a species of the invention is shown, in which—

Fig. 1 is a plan view of a fragment of an indexing type turret of a base-making machine carrying two series of molds and a glass stream cutter mechanism embodying the invention and adapted to cut two streams of molten glass flowing toward a mold in each series.

Fig. 2 is a similar view of the cutter mechanism on a larger scale and turned 90 degrees from the position thereof shown in Fig. 1.

Fig. 3 is a side, partly sectional view developed in part from a section taken along the line 3—3 of Fig. 2.

Fig. 4 is a schematic, partly sectional view through the deflector and the blade of the cutter mechanism shown in Figs. 1 to 3 and through a mold mounted on the turret of the base-making machine, showing the base shell and center contact pieces in the mold and showing also the course and the shape of a molten glass stream flowing from the orifice of a glass furnace through the deflector and the blade shortly after the deflector has been moved from a position wherein the passage through the deflector and the blade is closed to a position in which the said passage is open and before the glass stream has reached the bottom of the mold.

Fig. 5 is a similar view of the elements shown in Fig. 4 with the said passage open and the mold partially filled with molten glass to the desired level, and Fig. 6 is a similar view showing the passage closed and the mold filled to the desired level and before the turret has been rotated to bring the succeeding mold with its contained and properly spaced contact pieces into position directly beneath an orifice of the glass furnace.

Referring to Fig. 1 of the drawing the indexing type rotary turret 1 of the machine is shown for illustrative purposes as the carrier for two series of molten glass receiving molds 2 which serve as receptacles for and properly space the metal contact pieces 3 and 4 of the bases as shown in Figs. 4 to 6. The molds in each series are circularly arranged about the peripheral portion of the turret with a mold in each series located on a single radius of the turret.

The turret 1 is rotated in a horizontal plane and given an intermittent or step-by-step movement in a clockwise direction, indicated by the arrow in Fig. 1, by suitable means well known in the art, such as a Geneva gear drive (not shown). An index speed of about 200 per minute with a glass flow of about 120 to 125 pounds per hour in a three-sixteenth diameter single stream is typical of such machines not provided with the glass stream cutter described below. The turret presents the molds 2 in each series in succession to the several mechanisms of the machine located at stations around the turret for inserting the metal contact pieces of the bases in the molds, charging the molds with molten glass, molding the glass insulating pieces of the bases and ejecting the bases from the molds after the glass pieces have cooled sufficiently. As mechanisms for actuating the turret, for inserting the metal contact pieces in the molds and for performing the molding operations on the glass pieces of the bases are well known in the art in connection with machines having a turret carrying a single series of molds, having been described in prior patents to Swan, No. 796,470 patented August 8, 1905, to Marshall, Nos. 856,972 and 856,974, patented June 11, 1907, and to Walker et al., Nos. 1,210,237 and 1,210,238, patented December 26, 1916, illustration and description thereof has been omitted as being unnecessary for a complete understanding by those skilled in the art of the present invention which has to do with the mechanism for cutting and collecting during the indexing movement of the turret the glass streams flowing downward from spaced orifices of a glass furnace toward the two spaced series of molds carried beneath the orifices by the turret.

The glass stream cutter mechanism includes a subassembly 5 made up of a frame having two arms 6 and 7 supporting the stationary blade 8 and the deflector 9, hydraulic means 10 for actuating the deflector 9 and timing means 11 controlled by the main drive mechanism of the turret 1 for controlling the operation of the deflector actuating means 10. In the open position of the deflector 9 the parts of the cutter mechanism are in the relative positions shown in Figs. 1 to 5 to provide two spaced vertical open passages 12 and 13 through which molten glass streams may flow freely downward during the dwell period of the turret.

The subassembly including the frame 6, 7, the stationary blade 8 and the deflector 9 is supported above the turret 1 in the position shown in Fig. 1, in which the passages 12 and 13 are each above a mold 2 in each of the series of molds on the turret, with the turret at dwell, by a pair of rods 14 and 15 to the upper ends of which the arms 6 and 7 of the frame are secured by collars 16 and 17 and the lower ends of which are fastened by collars 18 and 19 bolted to the main support member 20 of the machine. The rod 15 is bent as shown in Fig. 1 to extend over part of the turret 1 carrying the molds 2. The blade 8 is elongated and is fastened to the arms 6 and 7 by the bolts 21. The deflector 9 is also elongated and is pivoted at its ends by journals 22 and 23 engaging bearing blocks (not shown) secured to the arms 6 and 7 in such position that the pivoted deflector 9 engages the stationary blade 8 as shown in Fig. 3 in which the pivoted axis of the deflector is indicated at 24.

The two spaced vertical open passages 12 and 13 are defined by the walls of cylindrical perforation openings through the blade 8, one of said openings being shown at 25 in Figs. 3 to 6, and the inner walls 26 and 27 of the two spaced tubular parts 28 and 29 of the deflector 9. With the deflector in the open position shown in Figs. 1 to 5 the cylindrical perforations in the blade 8 and the straight cylindrical openings or bores of the tubular deflector parts 28 and 29 defined by the walls 26 and 27, respectively, are coaxial to provide the passages 12 and 13.

When the deflector is rotated about its pivotal axis 24 to its closed position, as disclosed below, interference with the streams of molten glass entering the bores of the deflector parts 28 and 29 is avoided by providing flared glass stream receiving openings into the said bores. As shown at 30 and 31 in Fig. 2 of the drawing the inner walls 26 and 27 of the tubular deflector parts 28 and 29, respectively, are flared outward in an oval shape at the top of the deflector to provide such openings. The major axis of each of the flared openings provided by the wall parts 30 and 31 is in a plane including the longitudinal axis of the tubular part 28 or 29 of the deflector as the latter is rocked back and forth about its pivotal axis 24 between the open and the closed positions thereof.

The pivotal axis 24 of the deflector is normal to each of the longitudinal axes of the parallel bores defined by the inner cylindrical walls 26 and 27 of the deflector at a point at the level of the intersection of the flared openings defined by wall portions 30 and 31 with the walls 26 and 27, respectively, of the bores as shown in Figs. 4 to 6.

The surface of the lower ends of the tubular parts 28 and 29 around the glass delivery ends of the bores of the deflector and the upper surface of the blade 8 engage each other over a substantial area. These engaging surfaces are cylindrical with the axis of each of said cylindrical surfaces at the pivotal axis 24 of the deflector when the cutter mechanism is assembled. The cylindrical portions of the upper surface of the blade 8 extend in a lateral direction away from the cylindrical openings 25 a sufficient distance to engage the end cylindrical surfaces of the tubular parts 28 and 29 of the deflector 9 when the latter is turned on its pivotal axis 24 to its closed position shown in Fig. 6.

The hydraulic actuating means 10 for rocking the deflector 9 comprises a piston 33 movable in a hydraulic cylinder 34. The cylinder is pivoted at 35 on a support 36 fastened by bolts 37 to and extending outward from the frame arms 6 and 7. The piston is pivoted at 38 to a bracket 39 affixed to the center portion of the deflector between the tubular parts 28 and 29 of the deflector. The pivots 35 and 38 are offset laterally from the pivotal axis 24 of the deflector.

The cylinder 34 is provided with ports 41 and 42, one at each of its ends, so that the piston 33 may be reciprocated therein by passing air under pressure through one of said ports into one end of said cylinder while venting the opposite end of the cylinder through the port at that end and then reversing the operation. Reciprocation of the piston in this manner causes rocking of the deflector 9 around its pivotal axis 24 between its two operative positions described above, the stroke of the piston being long enough to effect this operation.

The timing mechanism 11 for the deflector actuating means 10 includes a cam shaft 44 engaging and rotated by the continuously rotating main drive shaft (not shown)

of the turret 1 and a disk-shaped cam 45 mounted on the end of the shaft 44. The operative face of cam 45 is engaged by the cam follower in the form of a roller 46 mounted on the end of the spring-biased piston 47 of the valve provided with the case 48. The valve 47, 48 is of a commercially available type and has a port 49 connected to a source (not shown) of air under pressure. The valve is also provided with two venting ports 52 and 53 connected by the conduits 54 and 55 to the ports 41 and 42, respectively, of the cylinder 34. The face of the cam 45 has a raised portion 56 which, on each revolution of the cam by the main drive of the turret 1, moves the outwardly biased piston 47 of the valve inwardly of the valve case 48. The inward movement of the piston 47 from the top of its stroke (Fig. 1) to the bottom of its stroke is effective for first disconnecting valve port 52 and therewith cylinder port 41 from the air pressure port 49 and connecting said ports 52 and 41 to the valve venting port 50 and immediately thereafter disconnecting valve port 53 and therewith cylinder port 42 from the valve venting port 51 and connecting said ports 53 and 42 to the air pressure port 49.

With the valve piston 47 at the bottom of its stroke the piston 33 of the actuating mechanism 10 thus is forced into the cylinder 34 to move the deflector 9 from its open to its closed position. When the projection 56 on the cam 45 has passed by the roller 46 and the spring biased valve piston 47 has moved from the bottom to the top of its stroke to reestablish the connections between the various valve and cylinder ports broken by the movement of the piston 47 from the top to the bottom of its stroke, the deflector 9 is returned to its open position.

The movements of valve piston 47 described above are so timed by the cam 45 with relation to the intermittent rotation of the turret 1 that the timing mechanism 11 is effective for actuating the glass stream cutter mechanism 10 to effect during dwell of the turret the operations illustrated schematically in Figs. 4, 5 and 6 of the drawing. In these figures the cycle of operation of the cutter assembly by the cutter mechanism during each dwell period of the turret 1 is illustrated. For simplicity of illustration only part 29 of the two tubular deflector parts 28 and 29 of the cutter assembly and the parts of the machine and the glass stream supply part of the glass furnace associated with part 29 have been shown.

In Fig. 4 the position of the parts illustrated and the shape of the glass stream is shown immediately after the turret 1 has been rotated from one position to a succeeding position and is at dwell, the deflector 9 has been pivoted from a closed to an open position by the mechanisms 10 and 11 (Figs. 1 and 2) and before the stream 57 of molten glass from the orifice of the glass furnace 58 has reached the bottom of the mold 2.

Fig. 5 shows the parts in the same relative position as in Fig. 4 but after sufficient time has elapsed for the stream 57 to reach the bottom of the mold 2.

In Fig. 6 the parts are illustrated in their positions immediately after the deflector 9 has been moved to its closed position by the mechanisms 10 and 11 as described above and immediately before the turret 1 has started to rotate to its succeeding position. It will be noted that at this time the glass is at the proper level in the holder 2 and that the glass stream has been severed and the glass is beginning to collect in the tubular bore of the deflector part 29. With the part 29 in this position the turret is rotated by its drive mechanism to its next position to replace the mold filled to the proper level with molten glass by a succeeding mold in the series on the turret to be filled.

When, or just before the turret 1 has reached its succeeding position the deflector 9 by the above described mechanisms 10 and 11 is returned to its open position (Figs. 4 and 5) in which the glass stream 57 together with the glass accumulated in the tubular part 29 during movement of the turret falls freely toward the mold as shown in Fig. 4.

The above described operation of the machine is continuous with the contact pieces of the bases being fed to the machine at stations around the turret 1 preceding the glass feeding station and with the bases provided with molded glass webs removed from the turret at a station succeeding the glass feeding and molding stations.

The filling of the mold with a charge of molten glass to the desired level is accomplished with no wastage of glass and in a minimum of time by the machine described above to the end that the machine is more efficient and the cost of mass producing bases of the type described is appreciably reduced. The saving in glass effected by the cutter mechanism is greater than 10% on the average. The cutter mechanism is useful on existing base making machines and its use on such machines requires merely that the indexing speed of the turret, or the rate of flow of the molten glass in the stream, or both, be changed in accordance with the reduction in the amount of glass required in the production of a given number of bases by a machine equipped with the cutter mechanism.

An additional advantage of the cutter mechanism resides in the cooling effect of the relatively large and massive metal deflector 9 and metal blade 8 on the molten glass passing therethrough, collected therein and in contact therewith during operation of the mechanism, which effect is beneficial in that it lowers the average temperature of the glass entering the mold to the end that the metal pieces of the bases are protected from excessive temperatures in the molten glass which tend to weaken and burn the metal of the base contact pieces. Obviously, this cooling effect can be enhanced by internally forced water cooling the deflector and the blade and by other conventional means, such as heat radiating fins or the like, mounted on these parts.

While I have shown and described a particular embodiment of the invention it will be understood, of course, that I contemplate that numerous changes in the form and details of the machine shown may be made by those skilled in the art without departure from the spirit and scope of the invention as defined in the appended claims, for example, other conventional means such as commercial electrical timing mechanisms may be utilized for controlling the operation of the cutter actuating mechanism in the manner described above, the subassembly 5 may be mounted on the rods 14 and 15 with the support 36 of the cylinder 34 extending opposite the direction of rotation of the turret 1 rather than in the direction of the rotation of the turret, that is, the subassembly 5 and the parts of the cutter mechanism supported thereby may be turned 180° from the position thereof shown in Fig. 1 to provide space for mounting the glass molding mechanism immediately adjacent the glass charging station of the machine, and the cutter mechanism may be adapted for use on base making machines having only one, or more than two series of molds by providing the cutter assembly with glass stream receiving passages corresponding in number to the number of such series.

What I claim as new and desire to secure by Letters Patent of the United States is:

1. A cutter assembly for a free falling stream of molten glass comprising a supporting frame, a stationary blade secured to said frame and having a cylindrical perforation extending vertically therethrough for the passage of a free falling molten glass stream, a glass stream deflector pivoted on said frame above said blade with its pivotal axis normal to the longitudinal axis of the perforation in said blade, said deflector engaging said blade and having a glass stream receiving elongated cylindrical opening extending therethrough transverse to the pivotal axis thereof, said opening extending above the level of the said pivotal axis and being flared outwardly at its upper end, the engaging surfaces of said blade and said deflector being around the upper end of said perforation and the lower end of said opening, respectively, and being curved on the same radius of curvature around said pivotal axis whereby said deflector is movable on its pivotal axis relative to said blade from an open position in which the opening therethrough is in registry with the perforation in said blade to provide a passage through said cutter assembly for a free falling molten glass stream to a closed position in which the lower end of the opening in said deflector is offset from said perforation and closed by the curved surface of said blade to sever a glass stream passing through said cutter assembly and to collect within said opening molten glass from the stream and back to its open positon to discharge through said blade perforation the glass collected in said deflector opening and to again provide a passage through said cutter assembly for a free falling glass stream.

2. A cutter assembly for a free falling stream of molten glass comprising a supporting frame, a stationary blade secured to said frame and having a cylindrical perforation extending vertically therethrough for the passage of a free falling molten glass stream, a glass stream deflector pivoted on said frame above said blade with its pivotal axis normal to the longitudinal axis of the perforation in said blade, said deflector engaging said blade and having a glass stream receiving elongated cylindrical opening therethrough of the same diameter as the perforation in said blade, said opening extending transversely of the pivotal axis of said deflector and having a glass stream receiving outwardly flared upper end adjacent said axis and a glass delivery lower end away from said axis, the engaging surfaces of said blade and said deflector being around the upper end of said perforation and the glass delivery lower end of said opening, respectively, and being curved on the same radius of curvature around said pivotal axis whereby said deflector is movable on its pivotal axis relative to said blade from an open position in which the opening therethrough is in registry with the perforation in said blade to provide a passage through said cutter assembly for a free falling molten glass stream to a closed position in which the glass delivery end of the opening in said deflector is offset from said perforation and closed by the curved surface of said blade to sever a glass stream passing through said cutter assembly and to collect within said opening molten glass from the stream and back to its open position to discharge through said blade perforation the glass collected in said deflector opening and to provide a passage through said cutter assembly for a free falling glass stream.

3. A cutter assembly for two free falling streams of molten glass comprising a supporting frame, a stationary blade secured to said frame and having spaced cylindrical perforations extending vertically therethrough for the passage of said free falling molten glass streams, a deflector for said streams pivoted on said frame above said blade with its pivotal axis normal to the longitudinal axes of the perforations in said blade, said deflector engaging said blade and having parallel spaced glass stream receiving elongated cylindrical openings therethrough of the same diameter as the perforations in said blade extending transversely to the pivotal axis of said deflector, each of said openings having a glass stream receiving outwardly flared upper end adjacent said axis and a glass delivery end away from said axis, said deflector comprising tubular parts the inner walls of which define said openings and the lower ends of which engage the surface of said blade, the engaging surfaces of said blade and the tubular parts of said deflector being around the upper end of said perforations and the lower delivery ends of said openings, respectively, and being curved on the same radius of curvature around said pivotal axis whereby said deflector is movable on its pivotal axis relative to said blade from an open position in which the openings therethrough are in registry with the perforations in said blade to provide passages through said cutter assembly for free falling molten glass streams to a closed position in which the glass delivery ends of said openings in said deflector are offset from the said perforations and closed by the curved surface of said blade to sever glass streams passing through said cutter assembly and to collect within said openings molten glass from the streams and back to its open position to discharge through said blade perforations the glass collected in said deflector openings and to provide passages through said cutter assembly for free falling molten glass streams.

4. A cutter mechanism for a free falling stream of molten glass comprising an assembly including a supporting frame, a stationary blade secured to said frame and having a cylindrical perforation extending vertically therethrough for the passage of a free falling molten glass stream, a glass stream deflector pivoted on said frame above said blade with its pivotal axis normal to the longitudinal axis of the perforation in said blade, said deflector engaging said blade and having a glass stream receiving elongated cylindrical opening extending therethrough transverse to the pivotal avis thereof, said opening extending above the level of the said pivotal axis and being flared outwardly at its upper end, the engaging surfaces of said blade and said deflector being around the upper end of said perforation and the lower end of said opening, respectively, and being curved on the same radius of curvature around said pivotal axis whereby said deflector is movable on its pivotal axis relative to said blade from an open position in which the opening therethrough is in registry with the perforation in said blade to provide a passage through said cutter assembly for a free falling molten glass stream to a position in which the lower end of the opening in said deflector is offset from said perforation and closed by the curved surface of said blade to sever a glass stream passing through said cutter assembly and to collect within said opening molten glass from the stream and back again to its open position to discharge through said blade perforation the glass collected in said deflector opening and to again provide a passage through said cutter assembly for a free falling glass stream.

References Cited in the file of this patent

UNITED STATES PATENTS

| | | |
|---|---|---|
| 2,179,317 | Barnard | Nov. 7, 1939 |
| 2,259,764 | Meyers | Oct. 21, 1941 |
| 2,271,004 | Gray | Jan. 27, 1942 |
| 2,296,711 | Gaskell | Sept. 22, 1942 |
| 2,393,265 | Richardson | Jan. 22, 1946 |